United States Patent
Sung et al.

(10) Patent No.: US 9,465,886 B2
(45) Date of Patent: *Oct. 11, 2016

(54) APPARATUS AND METHOD OF COMPOSING WEB DOCUMENT AND APPARATUS OF SETTING WEB DOCUMENT ARRANGEMENT

(75) Inventors: Young-hun Sung, Hwaseong-si (KR);
Sang-ryong Kim, Yongin-si (KR);
Yeun-bae Kim, Seongnam-si (KR);
Seong-woon Kim, Yongin-si (KR);
Chang-kyu Choi, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 415 days.

This patent is subject to a terminal disclaimer.

(21) Appl. No.: 13/584,976

(22) Filed: Aug. 14, 2012

(65) Prior Publication Data

US 2012/0311432 A1    Dec. 6, 2012

Related U.S. Application Data

(63) Continuation of application No. 11/896,449, filed on Aug. 31, 2007, now Pat. No. 8,266,521.

(30) Foreign Application Priority Data

Sep. 14, 2006    (KR) .................. 10-2006-0089219

(51) Int. Cl.
*G06F 17/22* (2006.01)
*G06F 17/30* (2006.01)
*G06F 3/0481* (2013.01)

(52) U.S. Cl.
CPC ....... *G06F 17/30905* (2013.01); *G06F 3/0481* (2013.01); *G06F 17/2247* (2013.01)

(58) Field of Classification Search
USPC ....... 718/200–203, 205, 209, 226, 227, 229, 718/234, 240, 243, 244, 255, 273, 700, 760, 718/762, 764, 790, 793, 794, 825, 838
See application file for complete search history.

(56) References Cited

U.S. PATENT DOCUMENTS 5,712,995 A     1/1998  Cohn
5,721,852 A  *  2/1998  Porter .......................... 715/777
(Continued)

FOREIGN PATENT DOCUMENTS

CN           1477596      2/2004
JP        2002-169751     6/2002
(Continued)

OTHER PUBLICATIONS

Chinese Office Action for corresponding Chinese Application No. 200710154096.7; issued Sep. 6, 2010.
(Continued)

*Primary Examiner* — Maikhanh Nguyen
(74) *Attorney, Agent, or Firm* — Staas & Halsey LLP

(57) ABSTRACT

An apparatus and method of composing a web document and an apparatus to set a web document arrangement are provided. The apparatus to compose a web document includes a generation module which generates a plurality of frames by analyzing a source of a web document, a composition module which arranges the generated frames using a predetermined frame arrangement mode, and an output module which displays the arranged frames on a screen.

13 Claims, 9 Drawing Sheets

(56) References Cited

U.S. PATENT DOCUMENTS

| | | | |
|---|---|---|---|
| 5,745,096 A * | 4/1998 | Ludolph et al. | 715/764 |
| 5,838,317 A | 11/1998 | Bolnick et al. | |
| 5,841,436 A * | 11/1998 | Nakamura | G09G 5/14 715/790 |
| 5,880,725 A * | 3/1999 | Southgate | 715/790 |
| 5,917,483 A * | 6/1999 | Duncan et al. | 715/802 |
| 5,920,315 A * | 7/1999 | Santos-Gomez | 715/792 |
| 5,933,843 A * | 8/1999 | Takai | 715/246 |
| 6,008,809 A * | 12/1999 | Brooks | G06F 3/0481 715/792 |
| 6,043,817 A | 3/2000 | Bolnick et al. | |
| 6,072,484 A * | 6/2000 | Kuroda | 715/799 |
| 6,101,510 A * | 8/2000 | Stone et al. | 715/234 |
| 6,166,736 A * | 12/2000 | Hugh | G06F 3/0481 715/777 |
| 6,266,684 B1 | 7/2001 | Kraus et al. | |
| 6,313,854 B1 | 11/2001 | Gibson | |
| 6,493,000 B1 | 12/2002 | Wynn et al. | |
| 6,968,536 B2 * | 11/2005 | Jazdzewski | 717/106 |
| 7,032,172 B1 | 4/2006 | Lee et al. | |
| 7,159,189 B2 * | 1/2007 | Weingart | G06F 3/0483 715/799 |
| 7,337,394 B2 * | 2/2008 | Nitta et al. | 715/210 |
| 7,360,168 B2 | 4/2008 | Bertram et al. | |
| 7,360,169 B2 * | 4/2008 | Duperrouzel et al. | 715/788 |
| 7,487,464 B2 * | 2/2009 | Grotjohn | G06F 3/0483 715/234 |
| 7,594,168 B2 * | 9/2009 | Rempell | 715/234 |
| 7,676,743 B2 * | 3/2010 | Seeler | 715/243 |
| 7,681,143 B2 * | 3/2010 | Lindsay et al. | 715/788 |
| 7,707,505 B1 * | 4/2010 | Ohrt et al. | 715/738 |
| 7,747,965 B2 * | 6/2010 | Holecek | G06F 3/0481 715/766 |
| 8,547,347 B2 * | 10/2013 | Chiang | G06F 3/041 345/173 |
| 2002/0054052 A1 * | 5/2002 | Sharma | G06F 17/30905 715/700 |
| 2002/0073123 A1 * | 6/2002 | Tsai | 707/526 |
| 2002/0144055 A1 * | 10/2002 | Nitta et al. | 711/108 |
| 2003/0071849 A1 * | 4/2003 | Ferri | G06F 3/0483 715/777 |
| 2004/0012615 A1 | 1/2004 | Jang | |
| 2004/0030719 A1 | 2/2004 | Wei | |
| 2004/0103371 A1 | 5/2004 | Chen et al. | |
| 2004/0255254 A1 * | 12/2004 | Weingart | G06F 3/0483 715/804 |
| 2004/0261039 A1 * | 12/2004 | Pagan | 715/797 |
| 2005/0015726 A1 | 1/2005 | Tuominen | |
| 2005/0086597 A1 * | 4/2005 | Duperrouzel et al. | 715/526 |
| 2005/0257131 A1 * | 11/2005 | Lim | G06F 17/30905 715/205 |
| 2006/0085741 A1 * | 4/2006 | Weiner et al. | 715/517 |
| 2006/0117255 A1 * | 6/2006 | Seeler | 715/520 |
| 2006/0117269 A1 | 6/2006 | Lai et al. | |
| 2006/0146059 A1 * | 7/2006 | Inoue | G06F 3/0481 345/546 |
| 2006/0224951 A1 | 10/2006 | Burke et al. | |
| 2006/0230335 A1 * | 10/2006 | Fischer | 715/501.1 |
| 2011/0145753 A1 * | 6/2011 | Prakash | 715/783 |

FOREIGN PATENT DOCUMENTS

| | | |
|---|---|---|
| KR | 2002-0006722 | 1/2002 |
| KR | 10-2004-0038458 | 5/2004 |
| WO | 00/39666 | 7/2000 |
| WO | 2004/107081 | 12/2004 |
| WO | 2005/071567 | 8/2005 |

OTHER PUBLICATIONS

Japanese Office Action issued Feb. 14, 2012 in corresponding Japanese Patent Application 2007-238159.
European Search Report issued Feb. 8, 2008 in corresponding European Patent Application 07116060.0-2201.
Korean Office Action issued Nov. 30, 2007 in corresponding Korean Patent Application No. 10-2006-0089219.
U.S. Office Action mailed Oct. 4, 2010 in related U.S. Appl. No. 11/896,449.
U.S. Restriction Requirement mailed Apr. 13, 2011 in related U.S. Appl. No. 11/896,449.
U.S. Notice of Allowance mailed May 17, 2012 in related U.S. Appl. No. 11/896,449.

* cited by examiner

FIG. 9
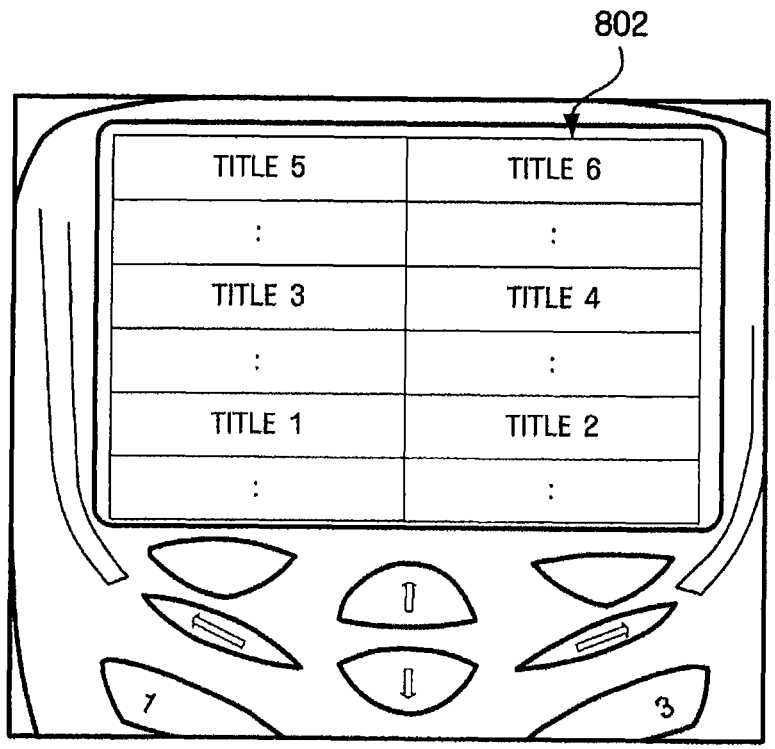
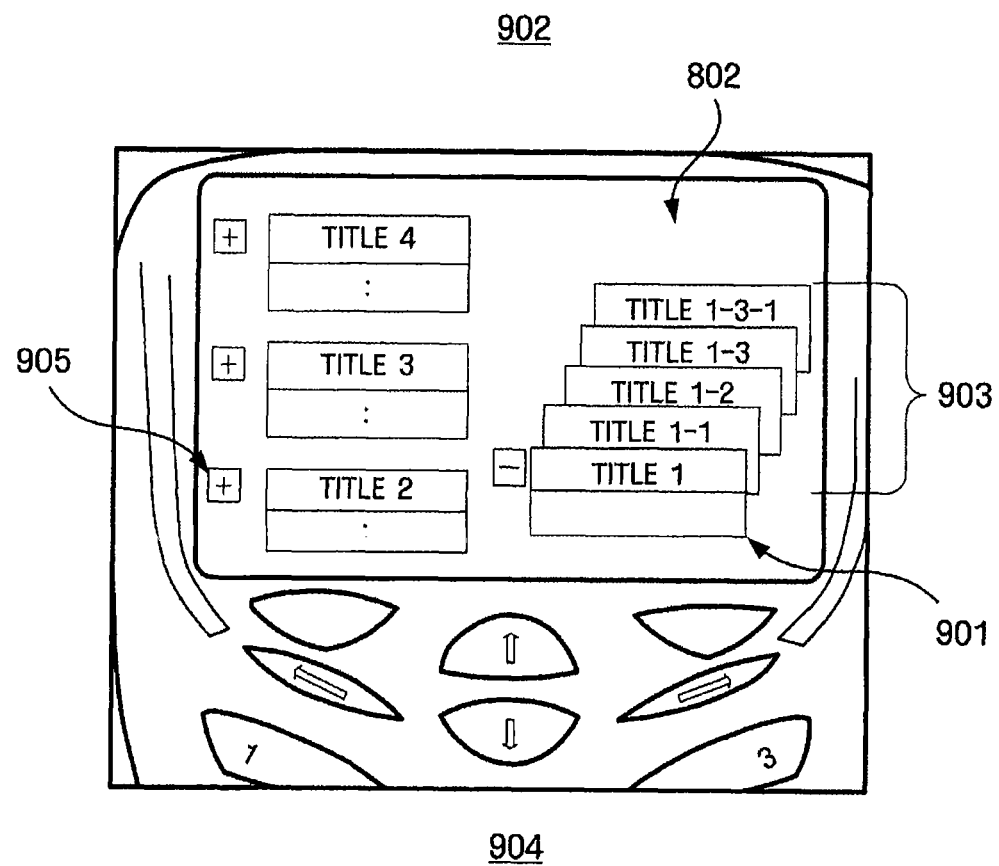

APPARATUS AND METHOD OF COMPOSING WEB DOCUMENT AND APPARATUS OF SETTING WEB DOCUMENT ARRANGEMENT

CROSS-REFERENCE TO RELATED APPLICATIONS

This application is a continuation of U.S. application Ser. No. 11/896,449 filed Aug. 31, 2007, now issued as U.S. Pat. No. 8,266,521 B2, which claims the benefit of Korean Patent Application No. 10-2006-0089219 filed on Sep. 14, 2006 in the Korean Intellectual Property Office, the disclosures of which are incorporated herein by reference in their entirety.

BACKGROUND

1. Field

The present invention relates to an apparatus and method of composing a web document and an apparatus of setting a web document arrangement, and more particularly, to an apparatus and method of composing a web document and an apparatus of setting a web document arrangement which can efficiently output a web document to a device equipped with a limited screen.

2. Description of the Related Art

Recently, an increasing number of devices that can provide web services, such as mobile phones, personal digital assistants (PDAs), Internet TVs, smart phones, web screen phones, and navigators of automobiles have been developed. Web services provide web documents created using such languages as Hyper Text Markup Language, eXtensible Markup Language (XML), and Script. In general, referring to FIG. 1, a web document 10 includes a plurality of content items, such as text, moving pictures, and image files. However, since the size of a screen of, for example, a mobile phone, is limited, a user is likely to have difficulty in looking over the web document 10 when the web document 10 is displayed on the screen of the mobile phone. Therefore, it is necessary to provide a user with convenient web services by efficiently arranging a plurality of pieces of information of a web document on a limited screen.

SUMMARY

The present embodiments provide an apparatus and method of composing a web document and an apparatus to set a web document arrangement which can provide users with convenient web services.

However, the aspects of the present embodiments are not restricted to the one set forth herein. The above and other aspects of the present embodiments will become more apparent to one of daily skill in the art to which the present invention pertains by referencing a detailed description given below.

The foregoing and/or other aspects are achieved by providing an apparatus to compose a web document. The apparatus includes a generation module which generates a plurality of frames by analyzing a source of a web document, a composition module which arranges the generated frames using a predetermined frame arrangement mode, and an output module which displays the arranged frames on a screen.

The foregoing and/or other aspects are achieved by providing an apparatus to compose a web document. The apparatus includes a generation module which generates a plurality of frames by analyzing a source of a web document, a composition module which arranges the generated frames using a predetermined frame arrangement mode, and an output module which displays the arranged frames on a screen, where the predetermined frame arrangement mode includes at least one of a cascade mode, a thumbnail mode, and a tree mode, the composition module arranges the generated frames so that titles of the generated frames can be prevented from overlapping one another, and, when the number of arranged frames exceeds the maximum number of frames that can be display on the screen by the output module, a number of frames corresponding to a difference between the number of arranged frames and the maximum number of frames that can be displayed on the screen by the output module are grouped into one or more tabs, and the tabs are displayed at a predefined location on the screen.

The foregoing and/or other aspects are achieved by providing an apparatus to set a web document arrangement. The apparatus includes a menu providing module which provides a setting menu to set a frame arrangement mode of arranging a plurality of frames on a screen, the frames being generated by analyzing a source of a web document, an arrangement module which arranges the frames using a predetermined frame arrangement so that titles of the frames can be prevented from overlapping one another, and a display module which displays the arranged frames on the screen.

The apparatus may include a menu providing module setting the predetermined frame arrangement mode of arranging the plurality of frames on the screen.

The foregoing and/or other aspects are achieved by providing a method of setting a web document arrangement, the method including: arranging a plurality of frames on a screen, the frames being generated by analyzing a source of a web document; and grouping the frames for display on the screen into at least one tab when the frames to be displayed exceed a maximum number of frames that can be displayed on the screen.

BRIEF DESCRIPTION OF THE DRAWINGS

The above and other features and advantages of the present embodiments will become more apparent by describing in detail preferred embodiments thereof with reference to the attached drawings, in which:

FIGS. 8 and 9 are diagrams for explaining examples of the arrangement of frames on a screen according to an embodiment.

DETAILED DESCRIPTION OF THE EMBODIMENTS

Figure 1:
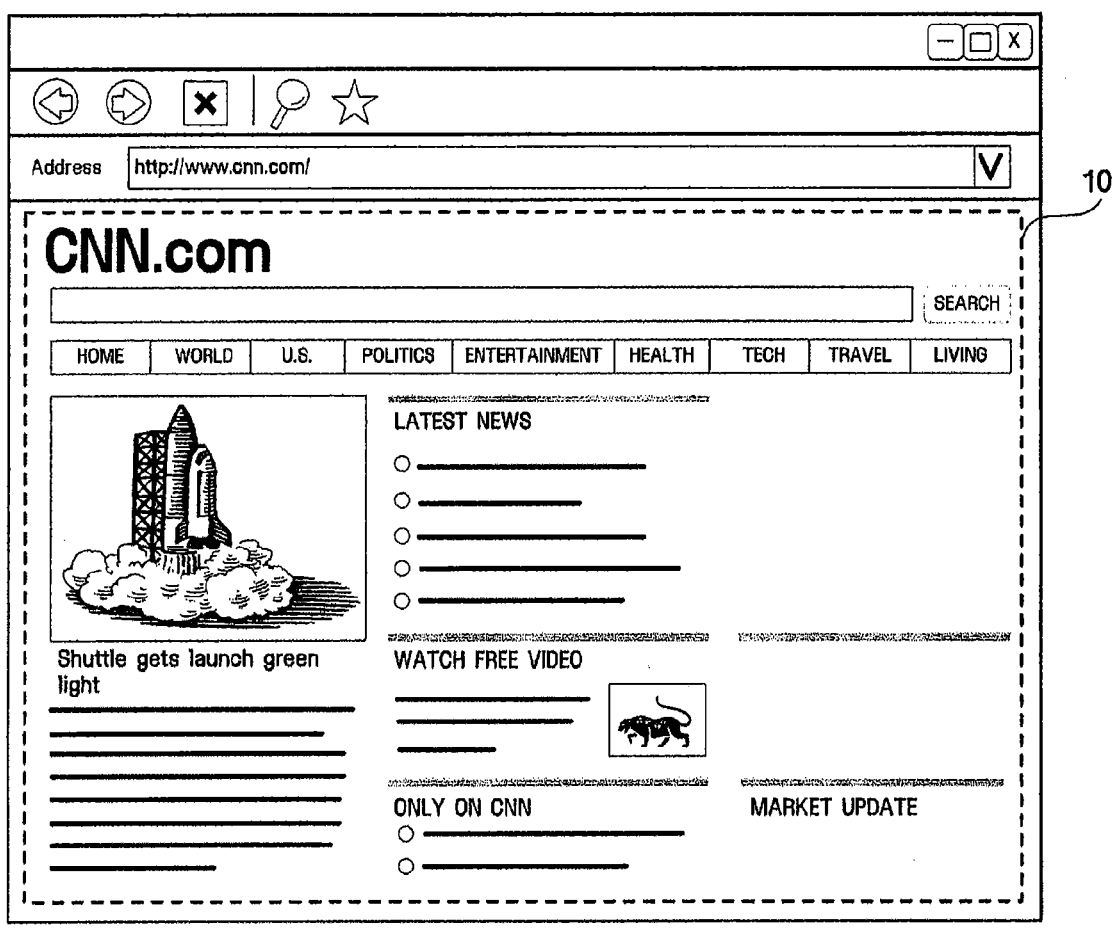
FIG. 1 illustrates a web document.

The present invention will now be described more fully with reference to the accompanying drawings, in which embodiments are shown. The invention may, however, be embodied in many different forms and should not be construed as being limited to the embodiments set forth herein;

rather, these embodiments are provided so that this disclosure will be thorough and complete, and will fully convey the concept of the invention to those skilled in the art. Like reference numerals in the drawings denote like elements, and thus their description will be omitted.

Figure 2:
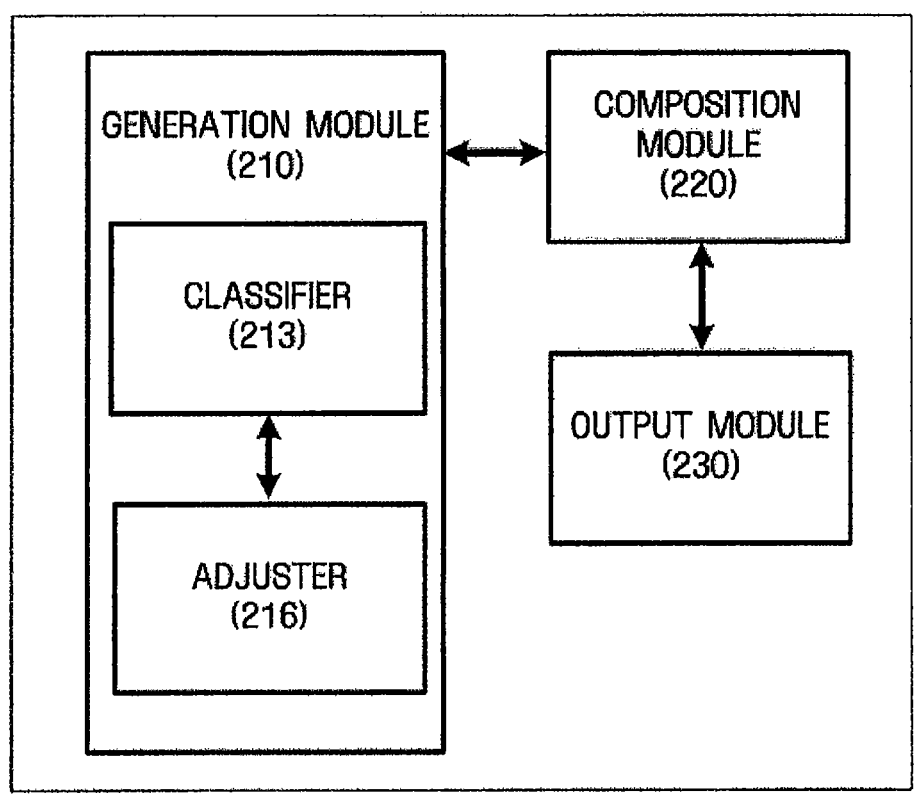
FIG. 2 is a block diagram of an apparatus to compose a web document according to an embodiment.

FIG. 2 is a block diagram of an apparatus 200 to compose a web document according to an embodiment. Referring to FIG. 2, the apparatus 200 includes a generation module 210, a composition module 220, and an output module 230. The generation module 210 includes a classifier 213 and an adjuster 216.

The generation module 210 generates a plurality of frames by analyzing the source of a web document. A frame is a window with a predetermined size and contains the contents of a web document. In detail, the generation module 210 searches the source of a web document for tags that divide a web document into one or more paragraphs, and generates a frame by combining a plurality of pieces of information included between a start tag and an end tag that is paired with the start tag. For example, assuming that the tags that divide a web document into paragraphs are defined as "<div>", the generation module 210 may generate a frame by combining a plurality of pieces of information included between a start tag "<div>" and an end tag "</div>". If a subparagraph using a tag "<table>" exists in "<div> . . . </div>", then the generation module 210 may generate a frame based on each sub-paragraph. The tags that divide a web document into paragraphs may be defined as "<div>", "<p>", "<table>", etc., according to a language that provides web services, and may be defined as "<div>", "<p>", or "<table>", etc. in advance.

The generation module 210 can determine the title of a frame title based on information included in the frame. For example, the generation module 210 may define a word or phrase that most frequently appears in information included in a frame as the title of the frame. Alternatively, the generation module 210 may define a word or phrase that appears first in a start tag as a frame title. The generation module 210 can determine the title of a frame so that a theme of the corresponding frame can be represented by the frame title.

The classifier 213 analyzes a plurality of pieces of information included in each of the frames generated by the generation module 210 and classifies the plurality of pieces of information according to their content types. For example, the plurality of pieces of information may be classified into text, dynamic images, and static image. Then, the adjuster 216 alters at least one of font size, content size, and resolution according to the results of the classification performed by the classifier 213. For example, when image size and resolution are reduced, the amount of content that needs to be displayed can be reduced, thus increasing the speed of outputting a web document.

The composition module 220 arranges the frames generated by the generation module 210 using a predetermined frame arrangement mode. Examples of the predetermined frame arrangement mode include a cascade mode, a thumbnail mode, and a tree mode. The composition module 220 may arrange the frames generated by the generation module 210 so that the titles of the corresponding frames can be prevented from overlapping one another. If the composition module 220 arranges the frames generated by the generation module 210 as a cascade and a frame is selected from the frame cascade, the composition module 220 may move the selected frame forward to the top of the frame cascade and move a frame that is previously followed by the selected frame backward to the bottom of the frame cascade so that the selected frame and the frame that is previously followed by the selected frame can become first and last frames, respectively, of the resulting frame cascade.

The output module 230 displays a sequence of frames obtained by the arrangement performed by the composition module 220 on a screen. The maximum number of frames that can be displayed on the screen is determined according to the size of the screen. If the number of frames obtained by the arrangement performed by the composition module 220 exceeds the maximum number of frames that can be displayed on the screen, then a number of frames corresponding to the difference between the number of frames obtained by the arrangement performed by the composition module 220 and the maximum number of frames that can be displayed on the screen may be grouped into one or more tabs, and the tabs may be displayed at a predefined location on the screen. Then, if one of the tabs is selected, the composition module 220 displays as a cascade a plurality of frames included in the selected tab on the screen with the aid of the output module 230.

A user can select one of a plurality of frame arrangement modes that are provided by the apparatus 200 using an apparatus to set a web document arrangement, and this will hereinafter be described in detail with reference to FIG. 3.

Figure 3:
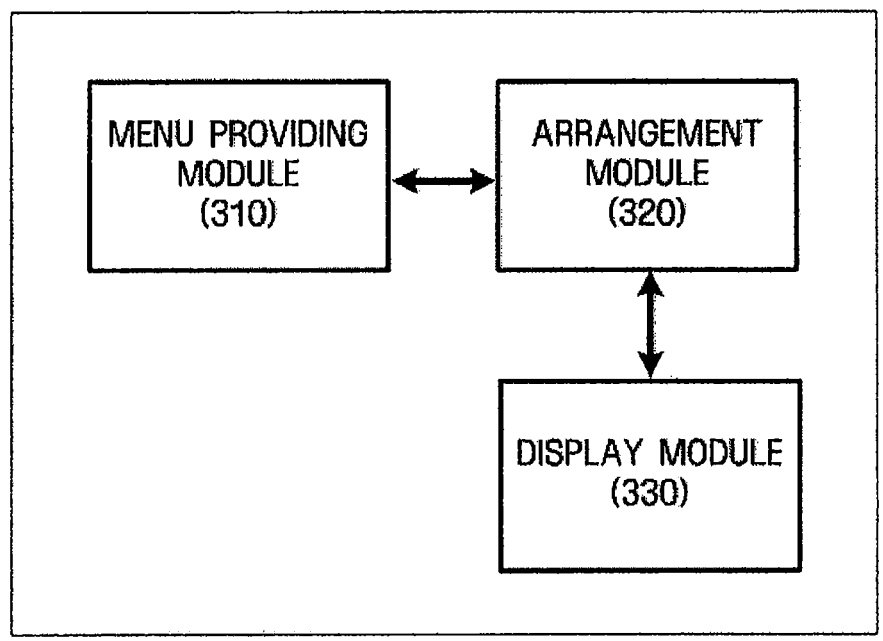
FIG. 3 is a block diagram of an apparatus to set a web document arrangement according to an embodiment.

FIG. 3 is a block diagram of an apparatus 300 to set a web document arrangement according to an embodiment. Referring to FIG. 3, the apparatus 300 includes a menu providing module 310, an arrangement module 320, and a display module 330.

The menu providing module 310 provides a setting menu to set a frame arrangement mode of arranging on a screen a plurality of frames that are generated through the analysis of a web document. The setting menu may provide a cascade mode, a thumbnail mode, and a tree mode, so a user can select one of the cascade mode, the thumbnail mode, and the tree mode. However, the present embodiment is not restricted to this. In other words, the present embodiment can be applied to various frame arrangement modes other than the cascade mode, the thumbnail mode, and the tree mode. The cascade mode may be set as a default frame arrangement mode.

If the number of frames to be displayed on a screen exceeds the maximum number of frames that can be displayed on the screen, then the menu providing module 310 may provide a setting menu to group a plurality of frames into one or more tabs, which are small windows that can be displayed at a predetermined location on the screen. In other words, if a user selects a menu item 'tab' from a setting menu, a number of frames corresponding to the difference between the number of frames to be displayed on the screen and the maximum number of frames that can be displayed on the screen may be grouped into one or more tabs, and the tabs may be displayed on the screen.

The arrangement module 320 arranges the frames generated by the generation module 210 using a frame arrangement mode that is currently being set. The arrangement module 320 arranges the frames generated by the generation module 210 so that the titles of the corresponding frames can be prevented from overlapping one another.

The display module 330 displays a sequence of frames obtained by the arrangement performed by the arrangement module 320 on the screen. If the menu item 'tab' is selected and the number of frames to be displayed on a screen exceeds the maximum number of frames that can be displayed on the screen, then the display module 330 may group a number of frames corresponding to the difference between the number of frames to be displayed on the screen and the maximum number of frames that can be displayed on the screen into one or more tabs, and the tabs may be displayed at a predefined location on the screen.

The menu providing module 310, the arrangement module 320, and the display module 320 may be included in the apparatus 200 illustrated in FIG. 2. In this case, the composition module 220 of the apparatus 200 may arrange a plurality of frames according to a frame arrangement mode set by the menu providing module 310, and the arrangement module 320 and the display module 330 are optional.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of embodiments, or they may be of the kind well-known and available to those skilled in the art of computer hardware and/or computer software.

Figure 4:
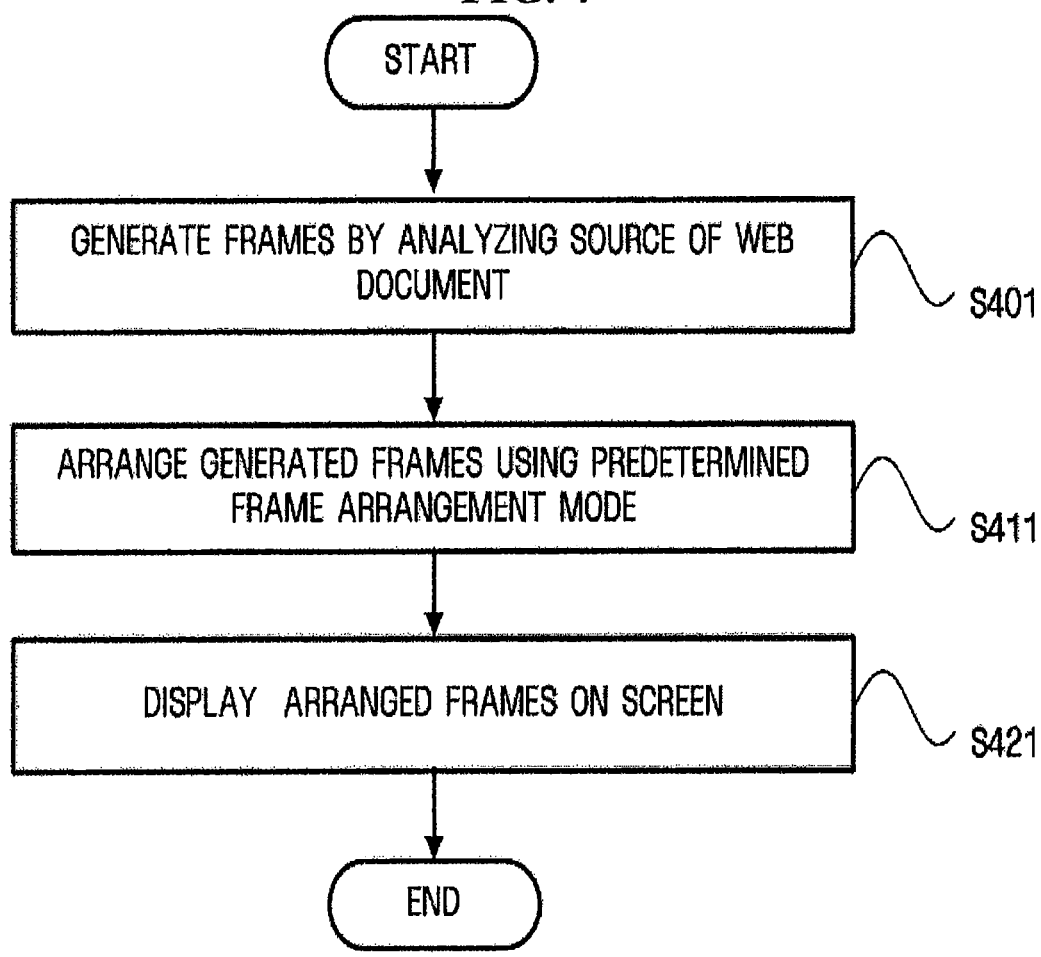
FIG. 4 is a flowchart illustrating a method of composing a web document according to an embodiment.

FIG. 4 is a flowchart illustrating a method of composing a web document according to an embodiment. The method illustrated in FIG. 4 may be performed by the apparatus 200 illustrated in FIG. 2.

Referring to FIG. 4, in operation S401, the generation module 210 generates a plurality of frames by analyzing the source of a web document. Web documents can be created using various Hyper Text Markup Languages (HTMLs). For example, the generation module 210 may search the source of an HTML web document for a <div> tag, and generate a frame using information included between the identified <div> tag and a </div> tag that is paired with the identified <div> tag. A plurality of pieces of information included in each of the frames generated by the generation module 210 may be classified according to their content types. Then, content size and resolution may be reduced according to the results of the classification, thereby reducing the amount of content that needs to be displayed.

Thereafter, in operation S411, the composition module 220 arranges the frames generated by the generation module 210 using a predetermined frame arrangement mode. Examples of the predetermined frame arrangement mode include a cascade mode, a thumbnail mode, and a tree mode. The composition module 220 may arrange the frames generated by the generation module 210 so that the titles of the corresponding frames can be prevented from overlapping one another.

In operation S421, the output module 230 displays a sequence of frames obtained by the arrangement performed by the composition module 220 on a screen. If the number of frames obtained by the arrangement performed by the composition module 220 exceeds the maximum number of frames that can be displayed on the screen, then the output module 230 may group a number of frames corresponding to the difference between the number of frames obtained by the arrangement performed by the composition module 220 and the maximum number of frames that can be displayed on the screen into one or more tabs, and display the tabs at a predefined location on the screen.

Figure 5:
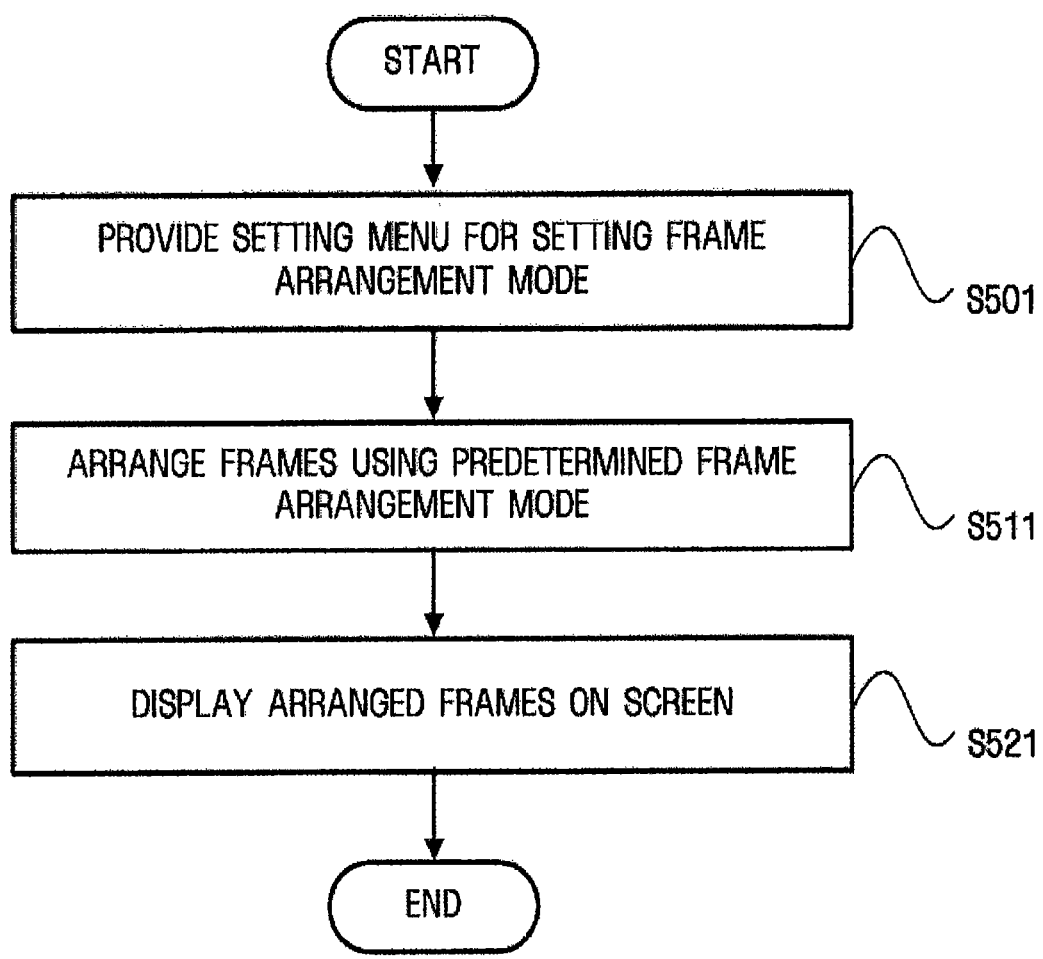
FIG. 5 is a flowchart illustrating the setting of the output of a web document according to an embodiment.

FIG. 5 is a flowchart illustrating the setting of the output of a web document according to an embodiment. The method illustrated in FIG. 5 may be performed by the apparatus 300 illustrated in FIG. 3.

Referring to FIG. 5, in operation S501, the menu providing module 310 provides a setting menu to set a frame arrangement mode of arranging a plurality of frames that are generated through the analysis of the source of a web document on a screen.

In operation S511, the arrangement module 320 arranges the frames according to a predetermined frame arrangement mode set using the setting menu.

In operation S521, the display module 330 displays a sequence of frames obtained by the arrangement performed in operation S511 on the screen.

Figure 6:
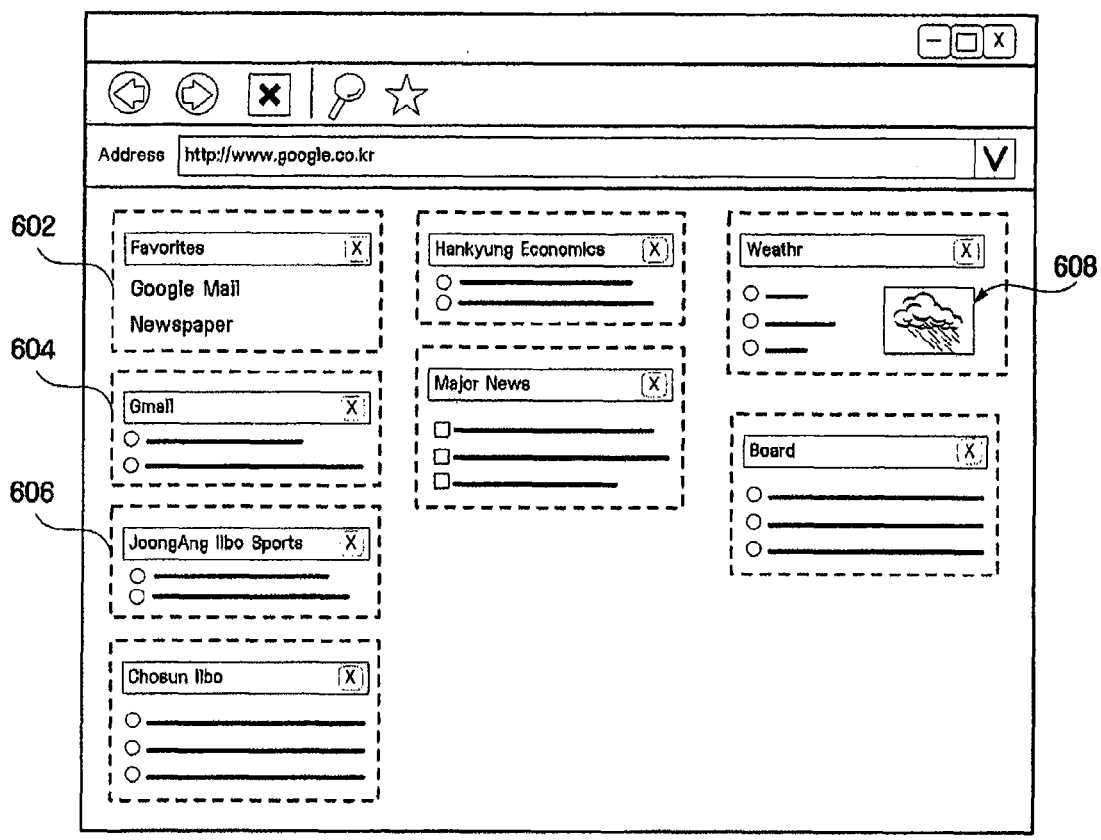
FIGS. 6 and 7 are diagrams for explaining a method of generating a frame of a web document according to an embodiment.
Figure 7:
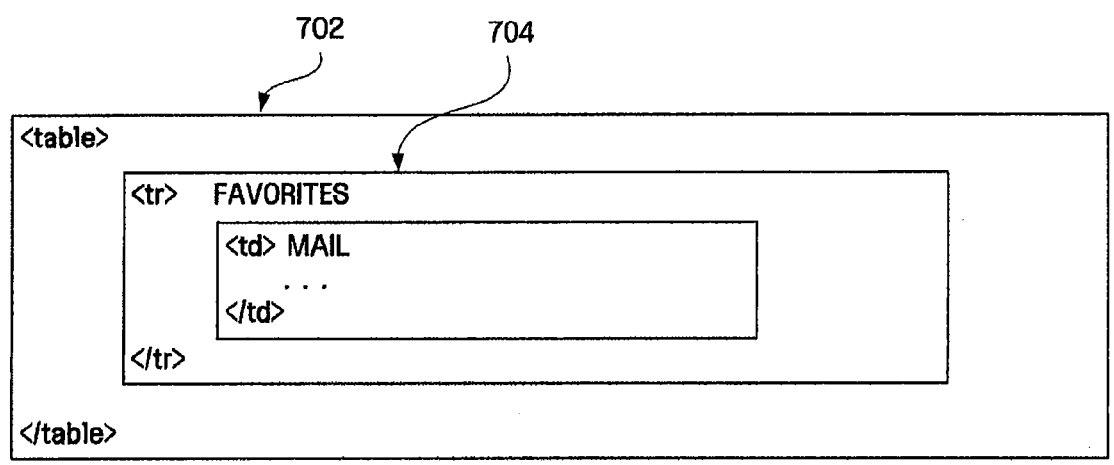

FIGS. 6 and 7 are diagrams explaining a method of generating a frame of a web document according to an embodiment.

Referring to FIG. 6, a web document is generally divided into a plurality of paragraphs 602, 604, and 606 having different themes. The source of the web document includes a plurality of tags that divide the web document into the paragraphs 602, 604, and 606, and the generation module 210 of the apparatus 200 illustrated in FIG. 2 uses the tags to generate a plurality of frames based on the source of the web document.

For example, referring to FIG. 7, if the tags that divide the web document into the paragraphs 602, 604, and 606 are defined as <table> (702), then the generation module 210 may generate a frame by combining a plurality of pieces of information included between a start tag <table> and an end tag </table>.

The generation module 210 can determine the title of a frame based on information included in the frame. For example, the generation module 210 may determine a phrase 'Favorites' that follows a tag <tr> (704) as a frame title.

Referring to FIG. 6, information included in each frame may include different types of content items 608 such as text, dynamic images, and static images. The classifier 213 classifies the content items 608 according to their types. Then, the adjuster 216 adjusts the content size and resolution according to the results of the classification performed by the classifier 213. For example, size and resolution adjustment may be performed for content items (e.g., images) with the extension 'jpg' or 'gif', and content items obtained by the size and resolution adjustment may be displayed in a frame as icons that are previously stored in a device.

Figure 8:
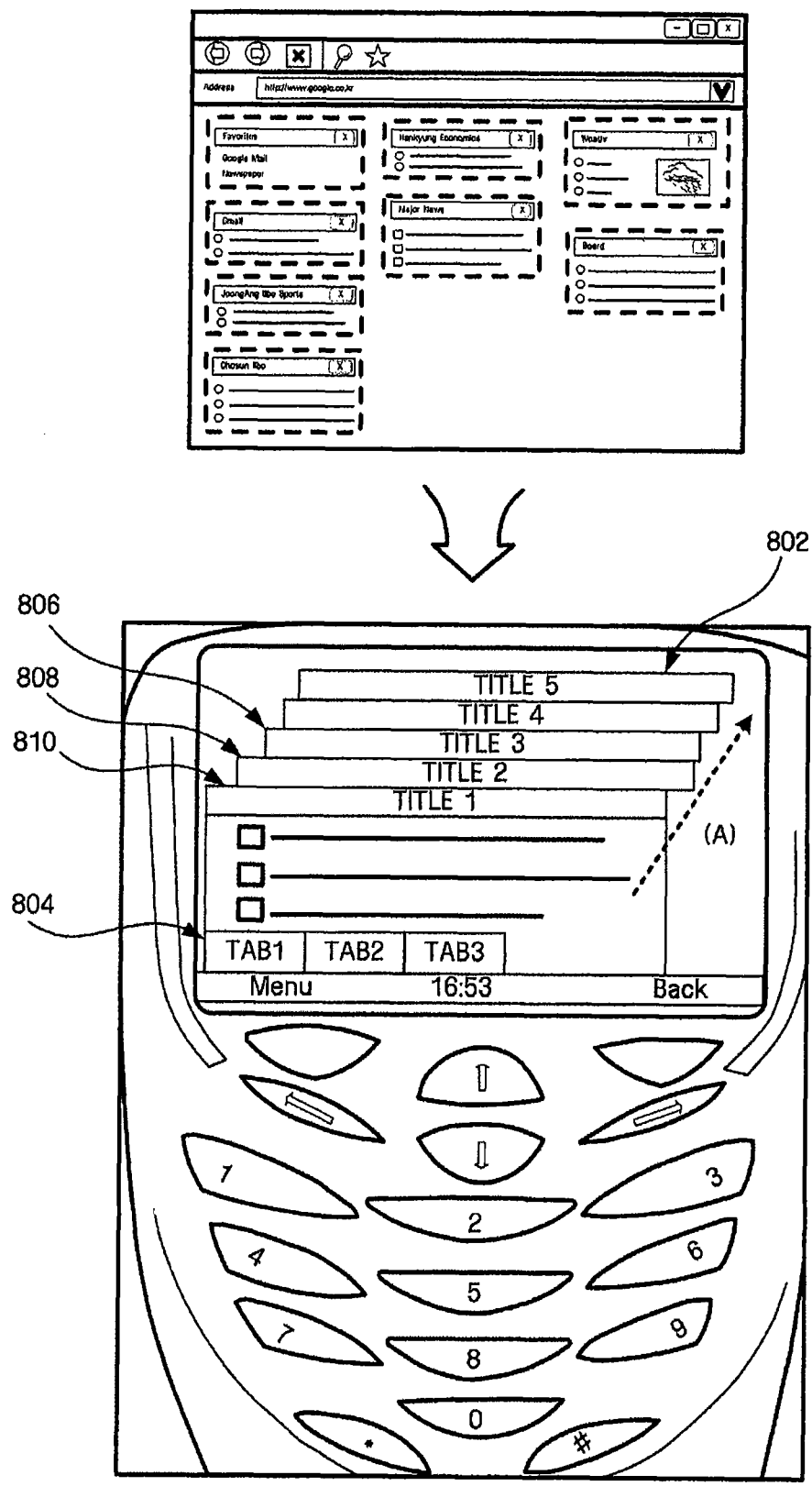

FIGS. 8 and 9 are diagrams for explaining examples of the arrangement of frames on a screen according to an embodiment.

Referring to FIG. 8, a plurality of frames 802 are arranged as a cascade so that the titles of the frames 802 can be prevented from overlapping one another. Thus, a user can easily determine the content and structure of a web document, and easily select a frame of his/her interest from the frame cascade. If the user selects a frame from the frame cascade, then the composition module 220 of the apparatus 200 illustrated in FIG. 2 may move the selected frame to the top of the frame cascade and move a frame that is previously followed by the selected frame to the bottom of the frame cascade. For example, if the user clicks on a frame 806 with title 3, then a frame 808 with title 2 and a frame 810 with title 1 may be moved backward to the bottom of the frame cascade, and the frame 806 and one or more frames that follow the frame 806 may be moved forward to the top of the frame cascade.

Referring to FIG. 8, if a user moves from one frame to another in a direction (A) by clicking a button or using a scroll function, frames that are previously located near the bottom of the frame cascade may be moved forward, and frames that are previously located near the top of the frame cascade may be moved backward, for example.

Referring to FIG. 9, a plurality of frames 802 may be arranged in a thumbnail mode 902. Alternatively, the frames 802 may be arranged in a tree mode 904. In detail, in the thumbnail mode 902, the frames 802 may be arranged as blocks having a predefined size, where the predefined block size is determined according to the size of a screen on which the frames 802 are to be displayed. In the tree mode 904, the frames 802 may be arranged as a tree having of one or more parent frames, each parent frame having one or more child frames. For example, when tags that divide a web document into paragraphs are defined as <table>, a frame 901 can be generated first based on information included between a start tag <table> and an end tag </table>. If the frame 901 includes another <table> tag, one or more frames can be generated as child frames 903 of the frame 901 based on the <table> tag in the frame 901, so that the child frames 903 belong to a lower level than the frame 901. In general, a web document can be divided into paragraphs having different themes, and each of the paragraphs can be divided into sub-paragraphs having sub-themes. Therefore, the tree mode 904 can enable a user to easily determine the content and structure of web documents and to easily select web documents of his/her interest. According to the present embodiment, a state indicator 905 may be displayed on the screen in order to indicate whether a frame having one or more child frames is opened or closed. If a user clicks on the state indicator 905 for a closed frame, the frame may be opened so that the frame and a number of child frames of the frame are displayed as a tree.

Referring to FIG. 8, if the number of frames that need to be displayed on a screen exceeds the maximum number of frames that can be displayed on the screen, then a number of frames corresponding to the difference between the number of frames that need to be displayed on the screen and the maximum number of frames that can be displayed on the screen may be grouped into one or more tabs, and the tabs may be displayed on the screen. For example, if the maximum number of frames that can be properly displayed on the screen without overlapping their titles and the number of frames that need to be displayed on the screen is greater than 10, then a number of frames corresponding to the maximum number of frames that can be properly displayed on the screen and the number of frames that need to be displayed on the screen are divided into one or more tabs 804, each tab including ten frames. If a user selects one of the tabs 804, then a plurality of frames included in the selected tab 804 may be displayed on the screen as a cascade.

As described above, the apparatus and method of composing a web document and the method of setting a web document arrangement according to the present embodiment have the following advantages.

First, it possible to effectively display web documents on a limited screen.

Second, it is possible to maximize user convenience by appropriately deciding how to arrange web documents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus to compose a web document, the apparatus comprising:
a processor to control one or more processor-executable modules;
a generation module generating a plurality of frames by analyzing a source of a web document;
a composition module to arrange the generated frames using a predetermined frame arrangement mode that comprises overlapping the generated frames with each other while preventing titles of the overlapped frames from being overlapped by another frame; and
an output module displaying the arranged frames on a screen,
wherein:
the generation module generates each title of each frame based on information included in a corresponding frame,
the output module displays a maximum number of frames on the screen, the maximum number being determined according to a size of the screen, and
when a number of the arranged frames exceeds the maximum number of frames that can be displayed on the screen by the output module, the output module groups a number of frames corresponding to a difference between the number of arranged frames and the maximum number of frames that can be displayed on the screen by the output module into one or more tabs, and displays the tabs at a predefined location on the screen.

2. The apparatus of claim 1, wherein: the predetermined frame arrangement mode includes at least one of a cascade mode, a thumbnail mode, and a tree mode.

3. The apparatus of claim 1, wherein, when one of the arranged frames is selected, the composition module moves the selected frame forward and moves a frame previously followed by the selected frame backward so that the selected frame becomes a first frame and the frame previously followed by the selected frame becomes a last frame.

4. The apparatus of claim 1, wherein, when one of the tabs is selected, the composition module arranges a plurality of frames included in the selected tab on the screen as a cascade.

5. The apparatus of claim 1, wherein the generation module searches for tags that divide the web document into one or more paragraphs and generates a frame based on a plurality of pieces of information included between a start tag and an end tag that is paired with the start tag.

6. The apparatus of claim 1, further comprising a menu providing a module setting the predetermined frame arrangement mode of arranging the plurality of frames on the screen.

7. The apparatus of claim 1, wherein the generation module generates each title of each frame to represent a theme of the corresponding frame.

8. The apparatus of claim 1, wherein the generation module defines a word or phrase that most frequently appears in information included in a frame as a title of the corresponding frame.

9. A method of composing a web document, the method comprising:

generating a plurality of frames by analyzing a source of a web document;

arranging, using a processor, the generated frames using a predetermined frame arrangement mode that comprises overlapping the generated frames with each other while preventing titles of the overlapped frames from being overlapped by another frame; and displaying the arranged frames on a screen, wherein:

in the generating of the plurality of frames, each title of each frame is generated based on information included in a corresponding frame, and the displaying comprises:

displaying a maximum number of frames on the screen, the maximum number of frames being determined according to a size of the screen; and when a number of the arranged frames exceeds the maximum number of frames that can be displayed on the screen, grouping a number of frames corresponding to a difference between the number of arranged frames and the maximum number of frames that can be displayed on the screen into one or more tabs, and displaying the tabs at a predefined location on the screen.

10. The method of claim 9, wherein: the predetermined frame arrangement mode comprises at least one of a cascade mode, a thumbnail mode, and a tree mode.

11. The method of claim 9, wherein the arranging comprises, when one of the arranged frames is selected, moving the selected frame forward and moving a frame previously followed by the selected frame backward so that the selected frame becomes a first frame and the frame previously followed by the selected frame becomes a last frame.

12. The method of claim 9, wherein the arranging comprises, when a tab of the one or more tabs is selected, arranging a plurality of frames included in the selected tab on the screen as a cascade.

13. The method of claim 9, wherein the generating comprises searching for tags that divide the web document into paragraphs and generating a frame based on a plurality of pieces of information included between a start tag and an end tag that is paired with the start tag.

\* \* \* \* \*